US010543533B2

(12) United States Patent
Jardine et al.

(10) Patent No.: US 10,543,533 B2
(45) Date of Patent: Jan. 28, 2020

(54) HYBRID SHAPE MEMORY EFFECT ELEMENTS FOR FACILE INTEGRATION TO STRUCTURES

(71) Applicant: Shape Change Technologies LLC, Thousand Oaks, CA (US)

(72) Inventors: Andrew Peter Jardine, Thousand Oaks, CA (US); Meghan Louise Cicchi, Thousand Oaks, CA (US)

(73) Assignee: SHAPE CHANGE TECHNOLOGIES LLC, Thousand Oaks, CA (US)

( * ) Notice: Subject to any disclaimer, the term of this patent is extended or adjusted under 35 U.S.C. 154(b) by 1038 days.

(21) Appl. No.: 14/595,079

(22) Filed: Jan. 12, 2015

(65) Prior Publication Data

US 2015/0196957 A1 Jul. 16, 2015

Related U.S. Application Data

(60) Provisional application No. 61/926,358, filed on Jan. 12, 2014.

(51) Int. Cl.
*B22F 7/08* (2006.01)
*B22F 3/02* (2006.01)
*B32B 15/01* (2006.01)

(52) U.S. Cl.
CPC .......... *B22F 7/08* (2013.01); *B22F 3/02* (2013.01); *B32B 15/01* (2013.01); *Y10T 428/12479* (2015.01)

(58) Field of Classification Search
CPC . B32B 11/005; B32B 15/01; B32B 2311/005; B22F 3/23
See application file for complete search history.

(56) References Cited

U.S. PATENT DOCUMENTS

| 4,824,276 A | 4/1989 | Ginell |
| 5,242,759 A | 9/1993 | Hall |
| 5,986,169 A | 11/1999 | Gjunter |
| 6,465,111 B1 * | 10/2002 | Streuber ............... B22F 3/1118 164/108 |
| 2004/0049282 A1 * | 3/2004 | Gjunter .................. A61F 2/442 623/17.16 |

(Continued)

OTHER PUBLICATIONS

Jardine, A. P.; "Fast-Response-Time Shape-Memory-Effect Foam Actuators" NASA Tech Briefs, 2010, p. 18-19. Accessed at https://ntrs.nasa.gov/archive/nasa/casi.ntrs.nasa.gov/20100028859.pdf.*

(Continued)

*Primary Examiner* — Mark Ruthkosky
*Assistant Examiner* — Julia L Rummel
(74) *Attorney, Agent, or Firm* — SoCal IP Law Group LLP; Jonathan Pearce (57) ABSTRACT

There is disclosed a method for chemically bonding TiNi materials to Nitinol constructs, comprising placing a Nitinol construct within a mold and packing a powder combination comprising Ti powder and Ni powder, and powder comprised of zero or more of the elements Cu, Hf, Zr, Pt, Pd, Au, Cd, Ag, Nb, Ta, O, N, B, and H, into the mold. The method further includes initiating a process of self-propagating high temperature synthesis of the powder combination within the mold to create a chemical bond between the Nitinol construct and a resulting TiNi foam to thereby create a Nitinol and TiNi assembly.

19 Claims, 9 Drawing Sheets

(56) References Cited

U.S. PATENT DOCUMENTS

2007/0118173 A1* 5/2007 Magnuson .............. A61F 2/013
606/200

OTHER PUBLICATIONS

"Nitinol Facts." NDC. Nitinol Devices & Components, Inc., n.d. Web. Jan. 12, 2015. <http://www.nitinol.com/nitinol-university/nitinol-facts>.
"Joining of Nitinol." Joining of Nitinol. Memry Corporation, n.d. Web. Jan. 12, 2015. <http://memry.com/nitinol-iq/nitinol-fundamentals/joining>.
"Bonding Nitinol." Bonding Nitinol. Masterbond, n.d. Web. Jan. 12, 2015. <http://www.masterbond.com/applications/bonding-nitinol>.
HCL Technologies, "Effective Use of Nitinol for Medical Devices". HCL Technologies, Ltd., Nov. 6, 2012. Web. Jan. 12, 2015. <http://www.hcltech.com/white-papers/engineering-rd-services/effective-use-nitinol-medical-devices>.
Wu, M.H. "Fabrication of Nitinol Materials and Components", Proc.Int.Conf on Shape Memory and Superelastic Technologies, Humming, China 2001, p. 285-292.
Bansiddhi, A. and Dunand, David C.,Shape-memory NiTi—Nb foams, J. Mater Res., vol. 24, No. 6, Jun. 2009. pp. 2107-2117.
C E Wen, J Y Xiong, Y C Li and P D Hodgson, Porous shape memory alloy scaffolds for biomedical applications: a review, Physica Scripta T139, May 28, 2010, 8 pages.
Muhammad A. Qidwai et al., Modeling of the thermomechanical behavior of porous shape memory alloys, International Journal of Solid Structures 38, May 1, 2001. pp. 8653-8671.

\* cited by examiner

© 2015 Shape Change Technologies LLC

HYBRID SHAPE MEMORY EFFECT ELEMENTS FOR FACILE INTEGRATION TO STRUCTURES

RELATED APPLICATION INFORMATION

This patent claims priority from U.S. Provisional Patent Application No. 61/926,358 entitled "Method of Integrating Shape Memory Effect Elements to Structures" filed Jan. 12, 2014.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to integrating shape memory effect metals into structures.

Description of the Related Art

Many mechanical elements are difficult to attach efficiently and reliably to structures. This is especially pronounced in Nitinol materials due to its Shape Memory Effect (SME) phase transformation generating strains of up to 8%, and to its surface chemical properties. Nitinol has a passivated surface of titanium oxide making it extremely resistant to any chemical bonding. Mechanical means have been used in the past to attach Nitinol materials to structures, for example U.S. Pat. No. 4,824,276 to Ginell instructs on how to make joints based on interlocking Nitinol wire with a non-Nitinol component.

Throughout this patent, the term Nitinol is used to describe an existing construct (e.g. wire, tubes, sheets, rolled sheets, braids of wire or tubes, ribbons, and other configurations) made of Nitinol to which TiNi foam mating couplers may be chemically bonded as described here. Nitinol and TiNi metals are chemically identical, but created through different processes. Specifically, TiNi is used to describe the porous foam created by the process described herein. Nitinol is typically made using an ingot that is drawn into wire, plate, or tube, so that the resulting material has different actuation and mechanical properties. A Nitinol construct as used herein is a pre-existing Nitinol article, such as the wire, tubes, sheets, rolled sheets, braids of wire or tubes, ribbons, or plates. A TiNi construct, such as a TiNi foam, TiNi mating couplers, or mating couplers, are TiNi articles made as a result of the induced exothermic process described herein. Both Nitinol and TiNi are created through the chemical combination of Ti, Ni and one or more elemental components of Cu, Hf, Zr, Pt, Pd, Au, Cd, Ag, Nb, Ta, O, N, B, and/or H.

The prior art has also addressed may of the common techniques for joining Nitinol SME elements, with websites of many Nitinol manufacturers offering some insights in to the various available techniques such as by soldering, welding, adhesion and mechanical means.

For bonding techniques, the stresses involved in the phase transformation require a high bond integrity between the Nitinol and the connecting material which has proven difficult to do using many techniques. For example, standard soldering is ineffective, and even specialized solder techniques using aggressive fluxes, such as Halogen based fluxes as taught by U.S. Pat. No. 5,242,759 to Hall are challenged to provide good bond integrity over a large number of cycles. Typical soldering techniques utilize an aggressive flux to remove the oxide layer and then utilize a Sn/Ag solder. The nature of the solder means that the joint is inherently soft, with supported shear stresses much lower than other techniques, and so is not recommended for large force applications.

Adhesives have also been developed for bonding Nitinol parts to external materials, generally in the medical device area. These are typically medical grade epoxies and are used to bond Nitinol to dissimilar materials, largely for isothermal applications [7]. Epoxies bonds breakdown over time when subjected to repeated thermal cycling and the bond can be weakened by water uptake along the bond surface.

Sol-Gel techniques to create a conversion coating also work for low stress applications, but are not as effective in bonding rigidly in large force applications.

Welding TiNi creates oxide impurities that embrittle the bond, even with TIG welding. The braze materials can create brittle intermetallics at the bond, especially with stainless steel, this technique is not recommended for large force applications required a ductile bond. Because of these bonding difficulties, as well as the large stresses on the joint inherent with the Shape Memory Effect, mechanical joints formed by clamping or crimping are typically used.

In many SME Nitinol applications, wires are clamped by capturing the wire under a tightened washer and bolt or screw head, swaged or crimped using soft brass or other simple crimping techniques. This techniques work adequately when the forces generated by the SME are small and when the joint is dry. Due to the strain changes in the Nitinol wire under cyclic transformations, clamping or crimping allow for slip of the wire over time, changing the length and zero-points of the device, and can result in breakage of the Nitinol wire. SME Nitinol can supply large forces, however as the forces on the mechanical joints increase, the clamp or crimp connection becomes more likely to become loose or to detach. For small Nitinol wires, say in the range of less than 0.005" outer diameter, clamping and crimping become more difficult, and so soldering or other techniques are used. Finally, the clamps are almost always different materials, such as stainless steel or brass, and so in moist, saline environments, galvanic corrosion can be a concern.

In all the above techniques, the focus has been on bonding or joining one Nitinol article to a separate, possibly dissimilar material. However, for large force SME actuation, many SME wires may be used and so the user is faced with a large number of bonds and techniques that are unwieldy for making a large number of joints and that are not suitable, reliable or robust enough for SME actuation generating large forces.

There is a need for a simple technique that can provide easily join a number of Nitinol wires or other Nitinol forms into a robust, chemically similar, structure that can reliably communicate the forces generated by the Nitinol materials into an external structure.

DESCRIPTION OF THE DRAWINGS

FIG. 3, made up of FIGS. 3A, 3B, 3C, 3D, 3E, and 3F, shows a series of alternative TiNi mating couplers joined to a Nitinol tube or wire.

FIG. 4, made up of FIGS. 4A, and 4B, shows two examples of alternative TiNi mating couplers, including a passthrough for gases or fluids through the joined Nitinol tubes.

FIG. 5, made up of FIGS. 5A, 5B, 5C, 5D, and 5E, shows several examples of alternative TiNi mating coupler and Nitinol tube, ribbon, or wire configurations.

FIG. 7, made up of FIGS. 7A, 7B, 7C, 7D, 7E, 7F, and 7G, shows a series of states during the creation of a Nitinol wire joined to a TiNi mating coupler using a self-propagating high temperature synthesis process.

FIG. 9, made up of FIGS. 9A and 9B, show a typical process for use of a joined Nitinol tube, ribbon, or wire and one or more TiNi mating couplers.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A technique has been developed that grows an open-celled, net shape TiNi foam onto any Nitinol article, such as a Nitinol wire, wire braid, rod, tube and sheet forms. This allows for a relatively stiff, net-shape article that has an effective strain transfer from the existing SME Nitinol material to the foam matrix. There is also chemical homogeneity between the two materials eliminating the problem of galvanic corrosion in moist environments.

The technique utilizes the process of Self Propagating High Temperature Synthesis (SHS) to make TiNi foam. In this process, Ti and Ni powders are packed around a SME Nitinol article. Under vacuum, or inert gas atmosphere, a chemical reaction is generated in the powder, typically by either touching the powder surface with a hot filament to start the reaction:

$$Ti+Ni=TiNi+\Delta H,$$

where the $\Delta H$ term is large and is sufficient to melt surrounding layers of the Ti and Ni powders into TiNi, thereby allowing for propagation of the exotherm. The heat generated by the reaction locally melts the Ti and Ni particles, allowing for rapid diffusion of the Ti and Ni into each other. In doing so, surface tension locally generates an open-celled porous structure, so that a TiNi foam is formed.

The SME Nitinol material and the SME TiNi foam bond because the heat generated by the SHS reaction is evidently sufficient to locally melt the near-surface of the SME Nitinol material. This creates a micro-weld between the SME Nitinol material and the TiNi foam, and because this reaction is under vacuum or inert atmosphere, the oxidizing problems of typical welding techniques are eliminated. The result is a strong bond between SME Nitinol and net shape TiNi foam.

There are numerous advantages of using this technique over other types of bonding.

First, the preheat temperature, required by the SHS technique to initiate the reaction, is quite low and so does not affect the thermal pre-processing of the Nitinol article. This is important because the alloy's thermal processing affects both the SME transformation temperatures and mechanical properties. In contrast, sintering and other high temperature techniques destroy the thermal processing, so the alloy structure must be reprocessed.

Further, the materials are chemically equivalent. This eliminates interface stresses due to differential thermal expansion. Because the materials are chemically equivalent, there are no galvanic couples if the materials are used in a moist environment or submersed in fluid.

Third, SME cycling stresses are also more easily handled, as the TiNi foam material will also transform. This is because the SHS process forms a plethora of micro-welds between the nitinol and the TiNi foam, providing a constant stress and strain distribution along the bond line, and so promote long-lived, strong mechanical bonds. As a result, the SHS joined Nitinol wire/foam assembly allows for large loads to be reliably secured, with no evident slippage.

Fourth, the SHS joined Nitinol/foam assembly allows for the easy handling of fine wires. The SHS joined Nitinol/foam assembly can join a multitude of Nitinol wires or other Nitinol forms into one end-termination TiNi foam element, eliminating the need for multiple crimps, welds or adhesively bonded sections, enabling a simple and effective manufacture of complex Nitinol actuation structures.

Fifth, the SHS joined Nitinol/foam assembly, with the multitude of TiNi foam end-termination shapes possible, provides for simple, reliable mechanical connections of the assembly to a mechanical structure.

Sixth, the SHS joined Nitinol/foam assembly provides for simple, reliable electrical connections of the assembly to an electrical power supply.

Seventh, the SHS joined Nitinol/foam assembly only effects the mechanical properties of the wire within and nearby the foam; the majority of the bare Nitinol wire preserves the heat treatments of the original supplier.

In addition to this joining technique, the foam end termination has a net shape that can be used to allow for simple and robust connections to an external structure. For example the foams external surface can be formed in the shape of a hexagonal prism, so that it fits snugly into a socket wrench. Other geometries that are possible are circular cross-sections with integrated gearing, or fluted sections for dogged attachments.

Finally, the foam allows for the easy incorporation of many polymer resins, such as epoxies, polyesters and silicones, as well as polymer resin systems that require pressure to flow. This allows for the foam/Nitinol article to be effectively bonded to a structure with the resin system as well as bonded into a net-shape polymer articles. This allows for more complex mating architectures between the TiNi/Nitinol/Polymer article and corresponding mating element.

Description of Apparatus

Figure 1:
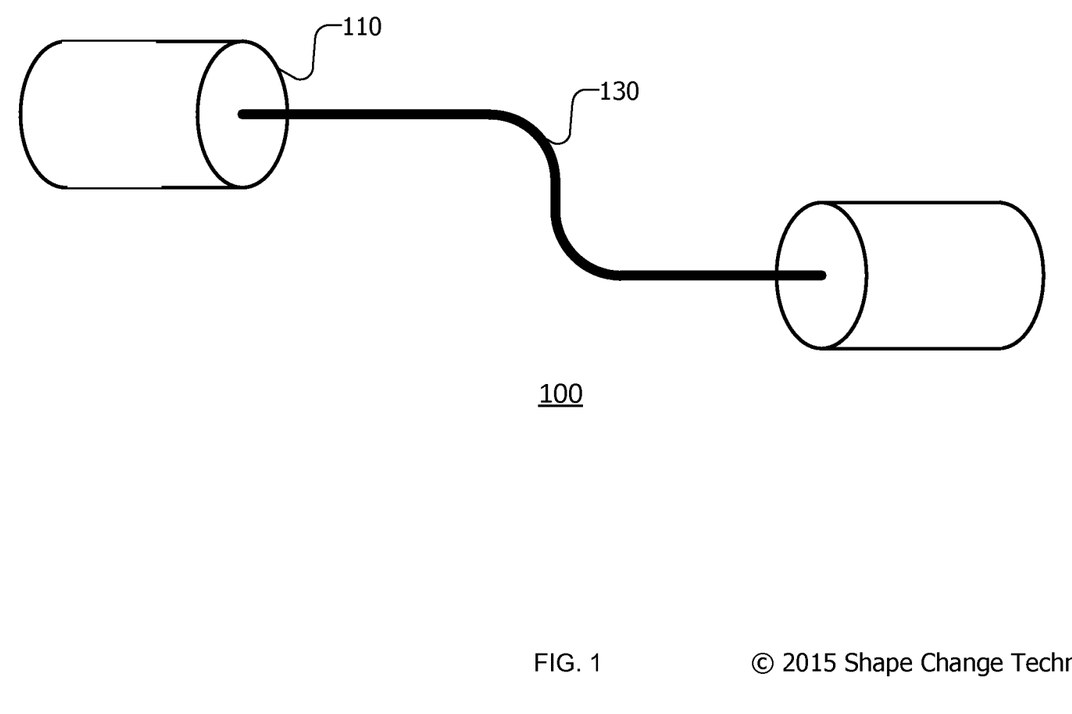
FIG. 1 is a Nitinol tube joined to a hexagonal TiNi foam mating coupler joined using a self-propagating high temperature synthesis.

Referring now to FIG. 1 a Nitinol tube joined to a hexagonal TiNi foam mating coupler joined using a self-propagating high temperature synthesis. In FIG. 1, a mating coupler 110 is attached using SHS to a Nitinol tube 130. The process of attachment described herein allows for easy and straightforward communication of torque to an external structure, generated by the shape memory effect twisting the tube 130. The tube 130 may be replaced with other forms of TiNi or Nitinol materials. These may take the form of wires, braided strands of wires, ribbons (elongated flat sheets), hollow tubes, pipes, levers, arms, struts, and other, similar, forms.

Figure 2:
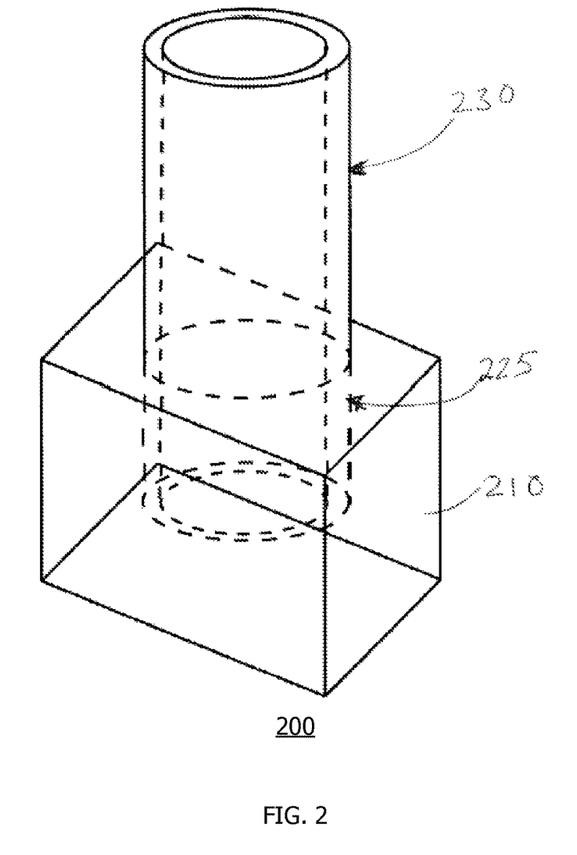
FIG. 2 is a cross-sectional view of a Nitinol tube joined to a square TiNi mating coupler.

FIG. 2 is a transparent view of a Nitinol tube 230 joined to a square TiNi mating coupler 210. The join 225 between the tube 230 and the mating coupler 230 is a chemical bond between the two, similar materials making up the tube 230 and 210 and is, therefore, much stronger, less-brittle, less-acceptable to moisture, less likely to break down over extended use, and more resilient than methods previously used.

FIG. 3, made up of FIGS. 3A, 3B, 3C, 3D, 3E, and 3F, shows a series of alternative TiNi mating couplers 310 joined to a Nitinol tube or wire 330. The choice of mold shape for the mating couplers 310 through 310"""" is determined by the geometry of the attachment to which the mating couplers 310 through 310"""" will be attached. The geometry is specific to the end user.

FIGS. 3A-3H are illustrated some of the end geometries that are currently possible with the SHS technique, though this is not an exclusive set of possible shapes. These are all illustrated with a single Nitinol wire for clarity, however it is understood that a multitude of Nitinol wires or other forms can be used.

Figure 3A:
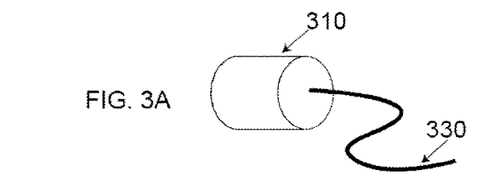
FIG. 3A is a circular mating coupler.
Figure 3B:
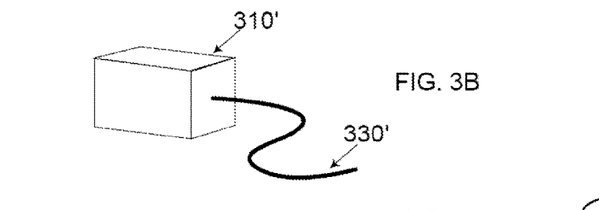
FIG. 3B is a square mating coupler.
Figure 3C:
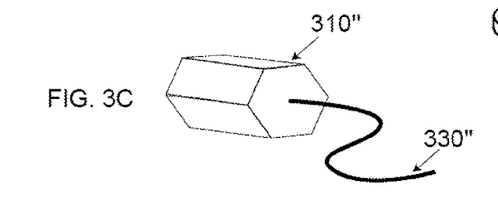
FIG. 3C is a hexagonal mating coupler.
Figures 3D, 3E, 3F:
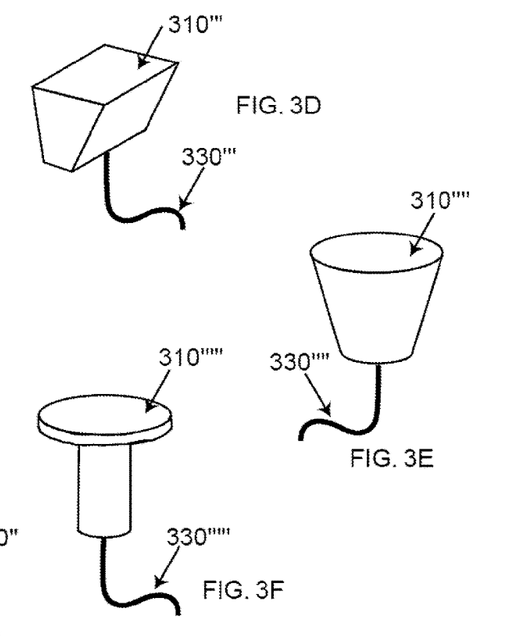
FIG. 3D is a wedge mating coupler.
FIG. 3E is a cone mating coupler.
FIG. 3F is a grommet mating coupler.
Figure 3G:
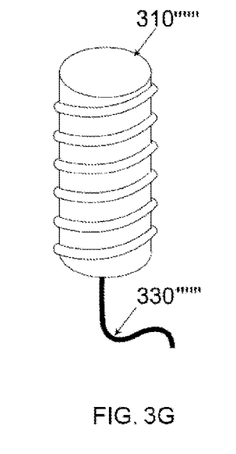
FIG. 3G is an externally-threaded mating coupler.
Figure 3H:
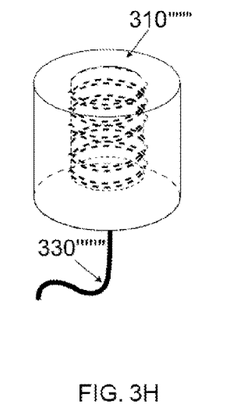
FIG. 3H is an internally-threaded mating coupler.

FIG. 3A shows a simple cylindrical foam mating coupler 310 with a Nitinol wire 330 attached. FIG. 3B shows a rectangular foam mating coupler 310' with Nitinol wire 330' attached. FIG. 3C shows a hexagonal foam mating coupler 310" with a Nitinol wire 330" attached. FIG. 3D shows a prismatic foam mating coupler 310''' with a Nitinol wire 330''' attached. FIG. 3E shows a tapered prismatic foam mating coupler 310'''' with a Nitinol wire 330'''' attached. FIG. 3F shows a tapered cylindrical foam mating coupler 310''''' with a Nitinol wire 330''''' attached. FIG. 3G shows a more complex mating coupler 310'''''' including a threaded exterior with a Nitinol wire 330'''''' attached. Finally, FIG. 3H shows an internally-threaded foam mating coupler 310''''''' attached to a Nitinol wire 330'''''''.

Including further electrical and mechanical attachments through bonding increases the number of shapes and functionality of the end-termination foam part. For bonding cylindrical Nitinol tubes or cylindrical Nitinol wire weaves, the same basic forms illustrated in FIG. 3 and still more forms can be used.

Figure 4A:
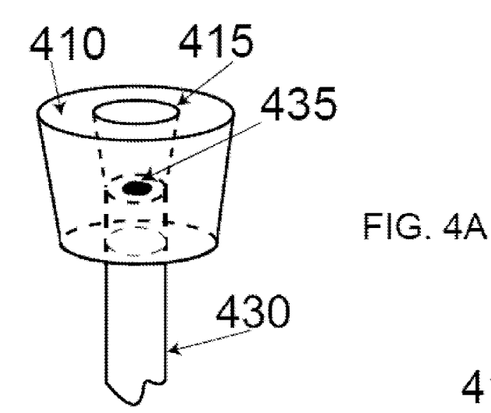
FIG. 4A is a cone mating coupler with a passthrough and FIG. 4B is a wedge mating coupler with a passthrough.
Figure 4B:
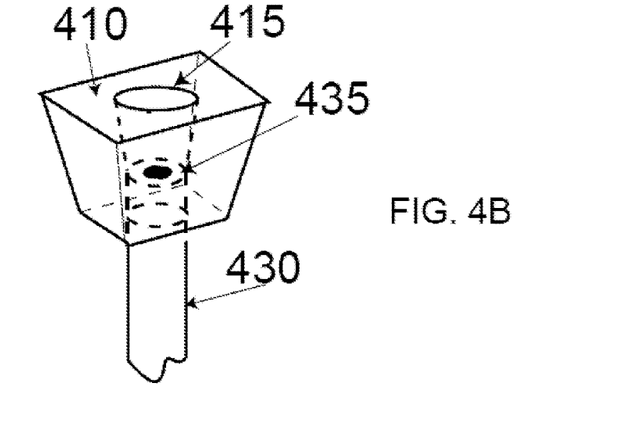

FIG. 4, made up of FIGS. 4A, and 4B, shows two examples of alternative TiNi mating couplers 410 and 410', including a passthrough for gases or fluids through the joined Nitinol tubes 430, 430'. Molds used to make the mating couplers 310-310'''''' may include through holes 415, 415', 435, 435' to enable fluids or gasses to pass through both the couplers 410, 410' and the tubes 430, 430'. These holes 415, 415', 435, 435' enhance cooling and heating of the Nitinol actuator. FIG. 4A shows a tapered cylindrical mating coupler 410 with a hole 415 with a corresponding hole 435 in the Nitinol tube 430. FIG. 4B shows a square (or cubic) mating coupler 410' with hole 415'. A corresponding hole 435' appears at the end of the Nitinol tube 430'. In both cases, a Nitinol tube was used for illustrative purposes only. Larger connections, such as pipes, may also be used.

Figure 5A:
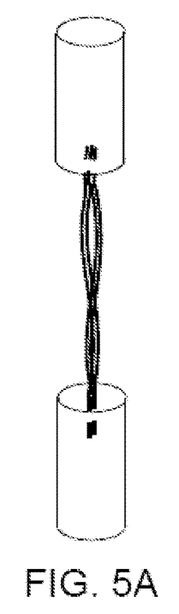
FIG. 5A shows a Nitinol wire weave with integrated cylindrical mating couplers.
Figure 5B:
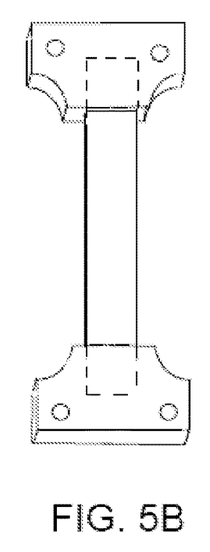
FIG. 5B shows a Nitinol ribbon or plate which is integrally bonded to SHS derived foam mating couplers in the form of a dog-bone structure with attachment holes.
Figure 5C:
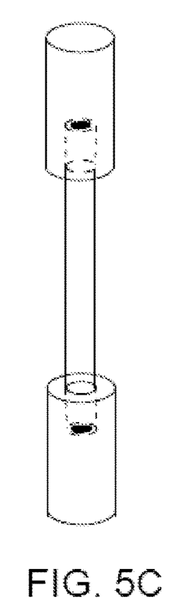
FIG. 5C illustrates a simple Nitinol tube or rod structure with integrated foam ends.
Figure 5D:
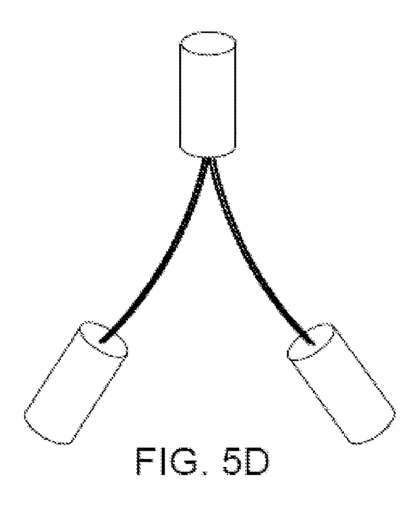
FIG. 5d illustrates two separate sets of Nitinol wires that are connected to a total of three mating couplers, with one mating coupler connected to both of the Nitinol wires. Various, more-complex SME actuation mechanisms may be created.
Figure 5E:
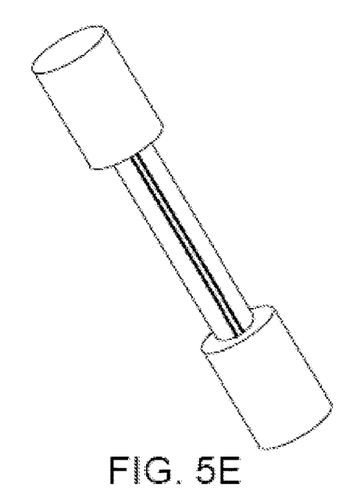
FIG. 5E shows a rolled TiNi sheet that is rolled for form a cylindrical geometry mated to two Nitinol foam mating couplers at each end.

FIG. 5, made up of FIGS. 5A, 5B, 5C, 5D, and 5E, shows several examples of alternative TiNi mating couplers and Nitinol tube, ribbon, or wire configurations. There are various possibilities in terms of the type and complexity of the actuator that can be manufactured using this technique. FIG. 5A shows a Nitinol wire weave with integrated cylindrical mating couplers. FIG. 5B shows a Nitinol ribbon or plate which is integrally bonded to SHS derived foam mating couplers in the form of a dog-bone structure with attachment holes. FIG. 5C illustrates a simple Nitinol tube or rod structure with integrated foam ends. FIG. 5D illustrates two separate sets of Nitinol wires that are connected to a total of three mating couplers, with one mating coupler connected to both of the Nitinol wires. Various, more-complex SME actuation mechanisms may be created. FIG. 5E shows a rolled TiNi sheet that is rolled for form a cylindrical geometry mated to two Nitinol foam mating couplers at each end.

The use of SHS connection allows for a multitude of actuator assemblies to be manufactured as a net shape process. As seen, the connectors can have a multitude of shapes, with integrated holes for fluid transfer, attachments to an external structure, or for electrical connections.

The geometry of the mating coupler depends entirely on user specifications. For example, six 0.020" diameter Nitinol wires will generate a force of approximately 120 lbf. For this load, the diameter of the foam mating coupler may be approximately 0.375" and the length may be approximately 1.5". The transformation stresses for Nitinol are approximately 65 KSi, and so there is a orders of magnitude increase in force as the wire diameter increases from 0.001" (which represents the smallest commercially available Nitinol wire) and 0.035", (which is the a largest diameter Nitinol wire that is available). Even larger forces are present in Nitinol tubes, (for example a 1.000" outer diameter tube with 0.060" wall tube will generate 3000 in.lb of torque). Consequently, the dimensions of the foam end-terminations must be appropriately scaled to the expected forces or torques and also to the external structure which the actuator is attached to. For example, the recovery stresses exerted by Nitinol will be approximately 63 Ksi, which is then transmitted into the TiNi structure. The recovery force exerted by the SME Nitinol element will then be the recovery stress multiplied by the relevant cross sectional area of the element. The TiNi foam ends will be sized according to the users wishes, however, if these are considered to be rigid, the relevant cross-sectional areas are recommended to be at least 50 to 100 times more than the SME Nitinol cross-sectional area.

Description of Processes

Figure 6:
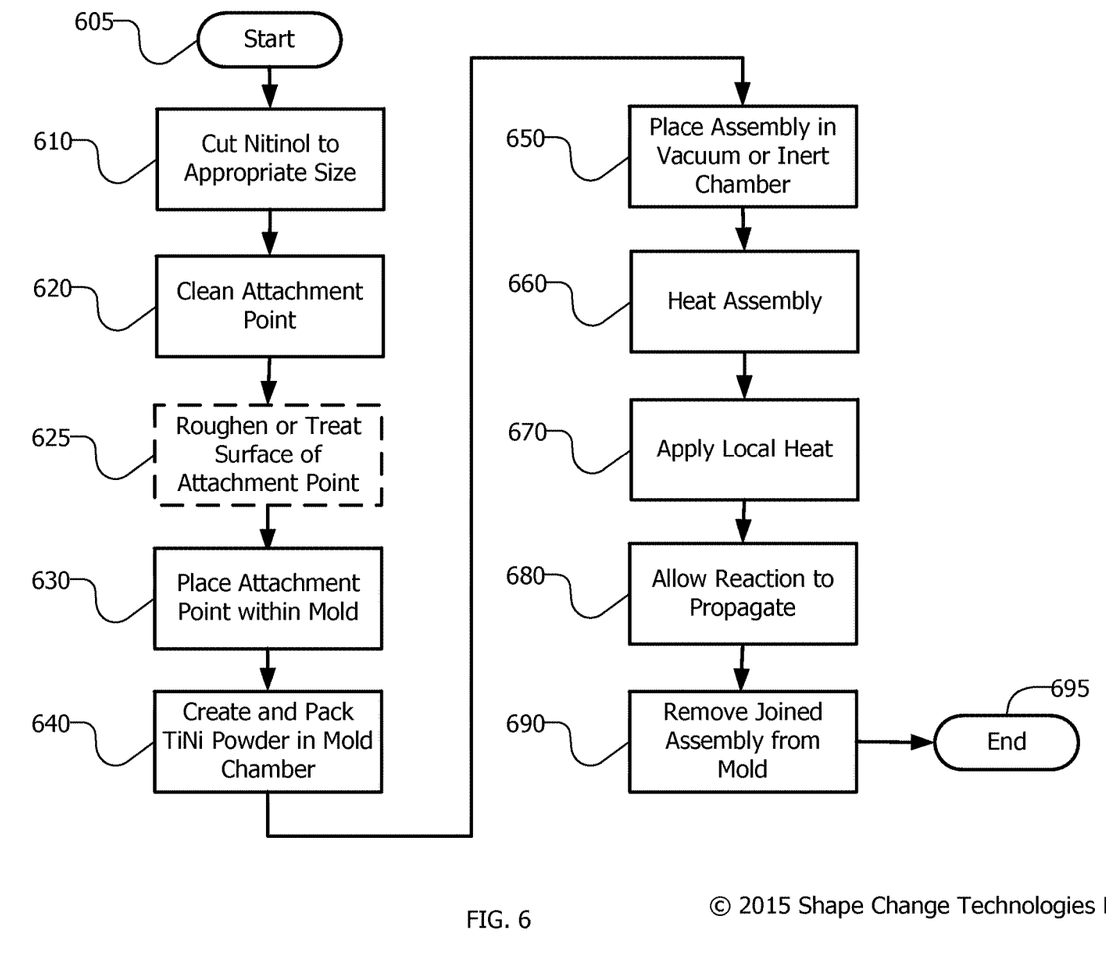
FIG. 6 is a flowchart of the process of joining a Nitinol tube, ribbon, or wire to a TiNi mating coupler.

Referring now to FIG. 6, a flowchart of the process of joining a Nitinol tube, ribbon, or wire to a TiNi mating coupler is shown. FIG. 7, made up of FIGS. 7A, 7B, 7C, 7D, 7E, 7F, and 7G, referred to throughout this description, shows a series of states during the creation of a Nitinol wire joined to a TiNi mating coupler using a self-propagating high temperature synthesis process. The flowchart begins at 605 and ends at 695.

First, at 610, the Nitinol, such as Nitinol wire 730 (FIG. 7A) available from a number of suppliers, is cut to the appropriate size (e.g. length, width, thickness, etc.) for the application.

Next, at 620, the attachment point 732 for the mating couplers, such as the end of the wire 730, are cleaned to remove any surfactants. This may be accomplished, for example using a combination of degreasers such as acetone, methanol and water. Optionally, at 625 (as shown by the dashed lines), the surface of the attachment point 732, such as the end of the wire 730, may then roughened using a grit blasting, sandpaper or chemical etching to promote a high surface contact area. Alternatively, at 625, the surface of the attachment point 732 may be chemically treated. Chemical treatments may provide a uniformly-rough surface and likewise promote a high surface contact area.

Figure 7A:
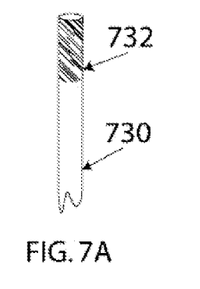
FIG. 7A shows a Nitinol wire.
Figure 7B:
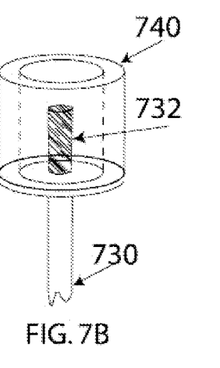
FIG. 7B shows a Nitinol wire and a mold.
Figure 7C:
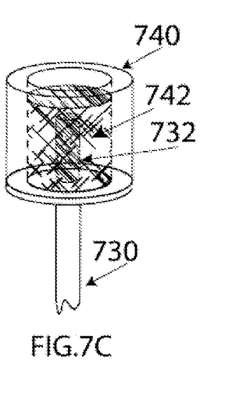
FIG. 7C shows a Nitinol wire, a mold and a Titanium and Nickel mixture.
Figure 7D:
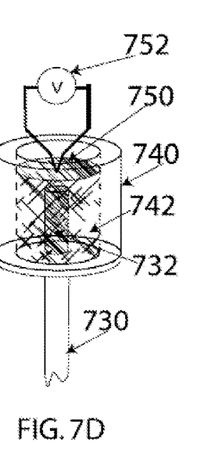
FIG. 7D shows the application of voltage to the mold.

At 630, the cleaned and bare attachment point 732 (e.g. Nitinol end of wire 730) are placed in a mold 740 (FIG. 7B), which both clamps the wire and allows for mechanically mixed Titanium, Nickel and additional ternary powders such as Nb, Cu, Al, Fe, Hf, Zr etc. powders to be introduced into the mold chamber 742 at least partially-enclosing the attachment point 732. (FIG. 7C).

Next, a TiNi powder mixture suitable for use creating a TiNi mating coupler joined to the attachment point 732 is created, then packed and pressed around the attachment point 732 within the mold chamber 742 at 640. The chemical composition of the powders is chosen based on application, but a reasonable range is 48 to 52 atomic percent Ni and a converse range of Ti. In some embodiments, this range is extended to between 45 to 56 atomic percent. When additional metals, such as Cu, Hf, Zr, Pt, Pd, Au, Cd, Ag, Nb, Ta, O, N, B, or H are used, or when alternative alloys are desired, atomic percentages in the range of 20-80% Ni, 20-80% Ti and the remaining percentage made up of one of the above-identified additional metals are also acceptable. Suitable metal powders are readily available from a variety of commercial suppliers. Molds, like mold 740, are typically made from either steel or stainless steel.

At 650, the assembly of molds and wire are placed in either an evacuated chamber or inert gas Argon atmosphere. At 660, the mold is heated to a temperature of between 150 to 400° C., depending on the desired resultant foam microstructure. For example, microstructures of the foam at varying temperatures alter the stiffness, transformation temperatures, and porosity of the resultant foam. These are examples of desired attributes.

At 670, local heat is applied to the TiNi powder compact which initiates an SHS process. The local heat causes part of the compact to melt, allowing for a chemical reaction between the Ni and Ti powders to begin generating TiNi intermetallic metal and also creates a large exotherm. The exotherm continues the reaction and generation of further local heat which converts the remaining powder to a metal foam.

Examples of techniques to initiate using local heat include heat transfer from touching a hot (2200° C.) Tungsten or Tantalum filament 750 (FIG. 7D) by running current through the filament by means of a power supply 752. Alternatively, electrical current may supply heating from 2 electrodes or an exotherm from a separate SHS reaction may be used. As the foam is metallic and therefore conductive, the mold can accommodate electrodes for electrical wire connections to joule heat the wire. Alternatively, the reaction can also be started by heating sufficiently rapidly that auto-ignition of the Ti and Ni powders can occur, or auto-ignition of an alternative starter powder whose heat of reaction will be sufficient to start the Ti and Ni chemical reaction. Still further, a powder composed of NiAl may be packed over or within the Ti and Ni. NiAl auto-ignites at relatively low temperatures and can be used as source of the local heat catalyst for the TiNi chemical reaction.

Figure 7E:
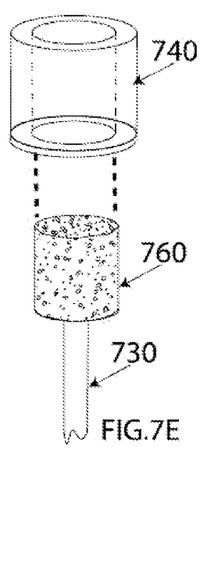
FIG. 7E shows the removal of the TiNi and Nitinol wire assembly from the mold.

At 690, after the reaction is complete, the Nitinol wire and TiNi mating coupler assembly 760 is removed from the mold 740 (FIG. 7E).

Figure 7F:
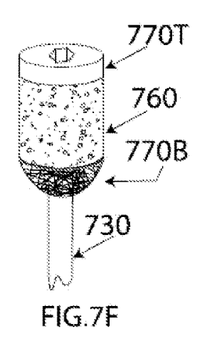
FIG. 7F shows the addition of epoxy to the exterior of the TiNi and Nitinol wire assembly.
Figure 7G:
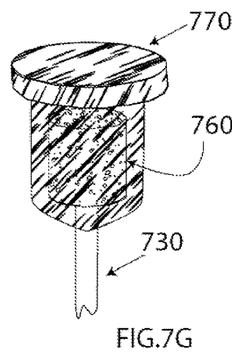
FIG. 7G shows the foam terminations can be potted into a polymer.

Optionally, additional work may be done, for example to trim the surfaces or to add epoxy 770T, 770B to the assembly 760 or other fillers to create additional geometry to the resulting TiNi and Nitinol assembly to allow for better seating. (FIG. 7F). Due to the good adhesion between the TiNi foam and many polymers that are cast in resin form, the foam terminations can be potted into an epoxy, polyester or other polymer such that the polymer shape better fits into a mating connector. (FIG. 7G) Epoxy resin bonds well to TiNi foam due to the numerous cavities and hollows of the foam. Thus, using epoxy, specific shapes may be more easily formed.

Figure 8:
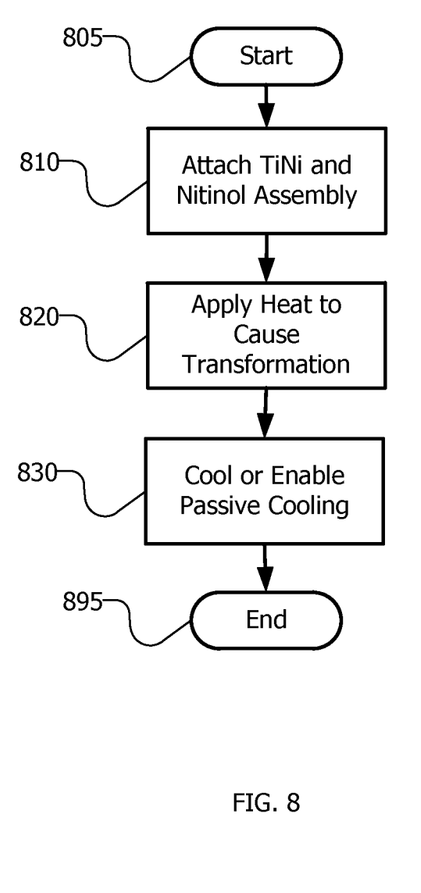
FIG. 8 is a flowchart of the process of using a joined Nitinol tube, ribbon, or wire in conjunction with one or more TiNi mating couplers.

FIG. 8 is a flowchart of the process of using a joined Nitinol tube, ribbon, or wire in conjunction with one or more TiNi mating couplers. The flowchart begins at 805 and ends at 895. The operation of the embodiments follows typical SME actuation methods. First, at 810 the TiNi and Nitinol assembly (e.g. one or more mating couplers joined to one or more Nitinol wires, tubes, pipes, sheets, ribbons, rolls or similar configurations) is joined to one or more structures using the mating couplers at 810. For example, a Nitinol wire and TiNi foam assembly may be attached a structure, such as to one or more attachment points between a fixed point and a moveable wheel or lever arm, such as for controlling valving. Alternatively, the assembly may be attached to a structure between a fixed point (mechanical ground) and a moveable structure, such as an airplane flap, robotic arms and other moveable subassemblies, locking mechanisms, for example on cars, doors etc, for heat engines or motors to convert heat or electrical energy respectively into mechanical power.

Next, at 820, the TiNi and Nitinol assembly is heated past its SME transformation temperature. This may be accomplished by immersion in hot fluids or gasses, or via electrical actuation. This heat causes the SME transformation to take place and generates force using the assembly. The forces are typically constrictive for Nitinol wire and result in assembly reducing its length by up to 8% and generating large forces in the process. For Nitinol rods or tube, the common form of deformation is by twist, rather than by contraction. In this case, on heating, a torque is generated that imparts a couple onto the mating connector. For plate structures, the element is typically bent along one axis and imparts a couple onto the mating connector as it straightens out on heating. For more complex shapes; bending, contraction and twist would likely occur on heating with large recovery stresses.

Once the force is no longer desired, cooling, either passively or actively is enabled at 830. This may take place via a passive process such as allowing the assembly to cool through heat dissipation in cool air. Alternatively, this may be an active process by immersing the assembly in cold water or by forcing cold fluids through the assembly.

Figure 9A:
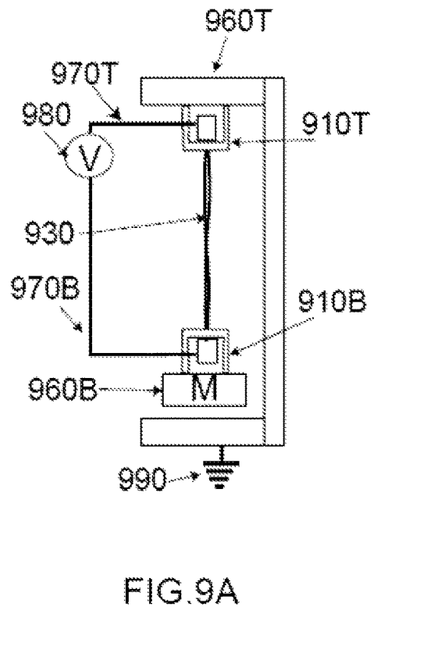
FIG. 9A shows a first configuration for shape memory effect actuator.
Figure 9B:
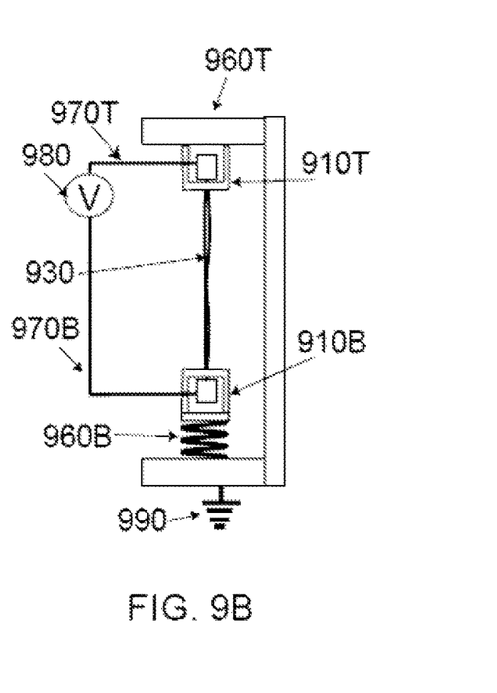
FIG. 9B shows a second configuration for a shape memory effect actuator.

FIG. 9, made up of FIGS. 9A and 9B, show a typical process for use of a joined Nitinol tube, ribbon, or wire and one or more TiNi mating couplers. FIGS. 9A and 9B show two common, generic actuation configurations that are the elements of most of the SME actuation devices in service.

FIG. 9A shows a SME actuator assembly, where the foam end mating couplers 910T, 910B mount into complementary mount points 965T, 965B. The mount points are mechanically joined to an external structure consisting of a fixed base 960T (serving a mechanical ground) and a moveable constant load, such as a moveable mass 960B.

For purposes of illustrative simplicity, the fixed base 960T and moveable constant load 960B are connected to wires 970T, 970B leading to a suitable power supply 980 and grounded via ground 990. When the circuit is closed and current is applied, the wire 930 heats up. When the wire 930 is heated past the transformation temperature, the dead-load is lifted as the Nitinol wire 930 contracts lifting the constant load 960B. When the heat is removed, the Nitinol wire 930 transforms and the constant load 960B extends the wire until the constant load 960B full extends the wire 930 and rests on the mechanical ground.

In FIG. 9B, the dead-load is replaced by a spring 960S (or reactive, such as countervailing Nitinol wire and TiNi assembly) load. The spring 960S (or reactive) load counteracts the Nitinol wire 930. As with FIG. 9A, when the Nitinol wire is heated, for example by the application of current, the spring 960S is counteracted and, when cooled, the spring 960S pulls the Nitinol wire 930 to a resting position.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A Nitinol and TiNi assembly comprising:
a Nitinol construct;
a TiNi foam created by:
placing the Nitinol construct within a mold;
packing a powder combination comprising Ti powder and Ni powder, and
optionally, powder comprised of one or more of the elements Cu, Hf, Zr, Pt, Pd, Au, Cd, Ag, Nb, Ta, O, N, B, and H, into the mold; and
initiating a process of self-propagating high temperature synthesis of the powder combination within the mold to create a series of micro-welds as a chemical bond between the Nitinol construct and a resulting TiNi foam to thereby create the Nitinol and TiNi assembly.

2. The assembly of claim 1, wherein the TiNi foam is further created by removing the Nitinol and TiNi assembly from the mold.

3. The assembly of claim 2, wherein the Nitinol and TiNi assembly comprises a Nitinol construct and the TiNi foam comprises one or more TiNi mating couplers.

4. The assembly of claim 3 further comprising an external structure, wherein the TiNi mating couplers are used to attach the Nitinol and TiNi assembly to the external structure.

5. The assembly of claim 1 wherein the atomic percentage of Ni powder in the powder combination is in the range of 45% to 56%.

6. The assembly of claim 1, wherein the TiNi foam is further created by placing the Nitinol construct within the mold and the powder combination within the mold into one of a vacuum and inert gas environment prior to initiating the self-propagating high temperature synthesis.

7. The assembly of claim 1 wherein, as the TiNi foam is created, the Nitinol construct within the mold and the powder combination within the mold are heated to a predetermined temperature to derive a TiNi foam with desired attributes.

8. The assembly of claim 1 wherein the Nitinol construct is in the form of a selected one of a wire, a tube, a plate, a sheet, a rolled plate, a ribbon, a braided tube, and a braided wire.

9. The assembly of claim 1 wherein the mold is of a desired geometrical shape.

10. The assembly of claim 1 wherein the Nitinol and TiNi assembly is made up of multiple TiNi foams and multiple, independent Nitinol constructs including multiple mating couplers.

11. A Nitinol and TiNi assembly comprising:
a Nitinol construct;
a tube construct for transmitting hot and cold fluids and gases to the Nitinol and TiNi assembly;
a TiNi foam created by
placing the Nitinol construct and at least a portion of the tube construct within a mold;

placing a tube made of a first metal or metal alloy with a melting temperature about 850° C. or a tube made of a ceramic material so as to transmit initiating material into the mold;

packing a powder combination comprising Ti powder and Ni powder, and, optionally, powder comprised of more than zero percent of one or more of the elements Cu, Hf Pd, Pd, Au, Cd, Nb, Ta, B O, N and H into the mold; and initiating a process of self-propagating high temperature synthesis of the powder combination within the mold to create a series of micro-welds as a chemical bond between the Nitinol construct and a resulting TiNi foam.

12. The assembly of claim 11, wherein the Nitinol construct is composed of Nitinol components with differing transformation temperatures.

13. The assembly of claim 11, wherein the powder combination has more than zero percent of one or more metal or ceramic fibers.

14. The assembly of claim 13 wherein the one or more metal or ceramic fibers are selected from the group comprising Copper, Stainless Steel, Titanium and its alloys, Zirconia, silica, glass, alumina, and quartz.

15. A Nitinol and TiNi foam assembly comprising:
a Nitinol construct,
a TiNi foam created by
    placing the Nitinol construct within a mold, wherein the Nitinol components have differing transformation temperatures;
    placing a metal wire or wire braid made of an alloy with a melting temperature above 850° C. within the mold;
    packing a powder combination comprising Ti powder and Ni powder, and, optionally, powder comprised of zero or more of the elements Cu, Hf, Pd, Pd, Au, Cd, Nb, Ta, B or O, N and H into the mold; and
    initiating a process of self-propagating high temperature synthesis of the powder combination within the mold to create a series of micro-welds as a chemical bond between the Nitinol construct and a resulting TiNi foam to thereby create and assembly of Nitinol and TiNi foam, with a tube construct to allow for the transmission of hot and cold fluids or gases or combinations thereof.

16. The assembly of claim 15 wherein the alloy is selected from the group comprising Stainless Steel, Copper, Brass, Steel, Titanium.

17. The assembly of claim 15, wherein the Nitinol construct is composed of Nitinol components with differing transformation temperatures.

18. The assembly of claim 15, wherein the powder combination comprises more than zero percent of one or more metal or ceramic fibers selected from the group comprising Copper, Stainless Steel, Titanium, Zirconia, silica, glass, alumina, or quartz.

19. The assembly of claim 15, wherein the TiNi foam is infiltrated with an electrically insulating polymer.

\* \* \* \* \*